United States Patent [19]
Rollins

[11] 3,777,546
[45] Dec. 11, 1973

[54] SYSTEM FOR CALIBRATING PRESSURE TRANSDUCER

[75] Inventor: Garland N. Rollins, Hampton, Va.

[73] Assignee: The United States of America as represented by the Administration of the National Aeronautics and Space Administration, Washington, D.C.

[22] Filed: Mar. 30, 1972

[21] Appl. No.: 239,577

[52] U.S. Cl. .................................. 73/4 R, 73/420
[51] Int. Cl. ............................................ G01l 27/00
[58] Field of Search ............... 73/4 R, 3, 205 R, 73/147, 420

[56] References Cited
UNITED STATES PATENTS
3,375,721  4/1968  Joesting ............................. 73/420
3,326,046  6/1967  Risher .................................. 73/4 R

*Primary Examiner*—Donald O. Woodiel
*Attorney*—Howard J. Osborn et al.

[57] ABSTRACT

A system for calibrating a pressure transducer which has a reference portion and an active portion. A miniature selector valve is positioned immediately adjacent the pressure transducer. A reference pressure, known pressure and unknown pressure can be selectively admitted to the active side of the pressure transducer by the selector valve to enable calibration of the transducer. A valve admits pressure to the selector valve which has a piston and floating piston arrangement which allows proper selection with very small linear movement.

16 Claims, 9 Drawing Figures

SYSTEM FOR CALIBRATING PRESSURE TRANSDUCER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Many systems exist which can be utilized to calibrate a pressure transducer. A system such as that shown in the Risher U.S. Pat. (3,326,046) shows a combination valve, pressure transducer assembly and calibration system in which a rotary valve switches sixteen transducers from independent unknown pressures to a common calibration pressure. A device such as shown by Risher, however, is large in size and therefore is prevented from being positioned at the optimum place in a test system. Obviously, with such a system, the pressure transducer is located at a substantial distance from the valving arrangement which is utilized to calibrate the pressure transducer. This allows a large volume of air to be located in the system between the pressure transducer and the valving arrangement. Accordingly, such a system does not enable the operator to measure a phenomenon of a short duration. Also an arrangement such as shown in Risher has no fail-safe position which guarantees that the valve will always be positioned to allow the reading of an unknown pressure if the pneumatic control for the system fails. Also, an arrangement such as Risher has provision for no more than one calibration pressure.

Other devices such as shown in the Collins U.S. Pat. (3,531,979) describes a dual chamber transducer which requires no valving to accomplish calibration with a known pressure. Its calibration is, however, limited to pressure higher than the unknown pressure and is not capable of calibrating at low or negative pressures.

SUMMARY OF THE INVENTION

The invention presented in this application overcomes the many difficulties inherent in prior art devices. One of the biggest problems in calibrating a transducer is that of reducing the distance between the transducer and the source of pressure applied to the transducer. The solution to this problem is to provide a switching device which is sufficiently small so that it can be placed immediately adjacent to the transducer. Applicant's calibration system utilizes a selector switch which is of the miniature type and under most circumstances can be placed immediately adjacent to the pressure transducer. The selector valve has a double piston arrangement with one of the pistons being a floating piston. The cylinder housing for the pistons is designed to limit the travel of the floating piston and thereafter limit the travel of the other piston allowing a very short linear movement to select the various positions necessary for calibrating the pressure transducer utilizing a known pressure, unknown pressure and reference pressure. Since the selector valve is immediately adjacent to the pressure transducer, there is little or no volume of air located between the two devices. Thus, the measurement phenomenon of short duration is assured. The device is also designed so that it has a fail-safe position which guarantees the selector valve will always be positioned to allow the reading of the unknown pressure even if the system for actuation of the selector valve fails. The system is designed so that the more than one calibration pressure can be determined. The device is also capable of calibrating low or negative pressures as well as a range up to very high pressures. The entire system has a minimum of moving parts which move a minimum distance thereby assuring a device which is very accurate, is economical to manufacture and maintain, and is subject to little or no maintenance.

A big advantage of the system is that the pressure transducer can be very accurately calibrated while remaining in its normal position for obtaining pressure readings. This is particularly important when the pressure transducer is placed in hard-to-get-at areas such as the leading or trailing edge of an airfoil. Of course, it is well known that if the pressure transducer must be removed and replaced for calibration, the accuracy is greatly affected since the transducer normally cannot be replaced in exactly the same manner or position that it may have been placed originally.

DESCRIPTION OF THE PREFERRED EMBODIMENT OF THE INVENTION

Figure 1:
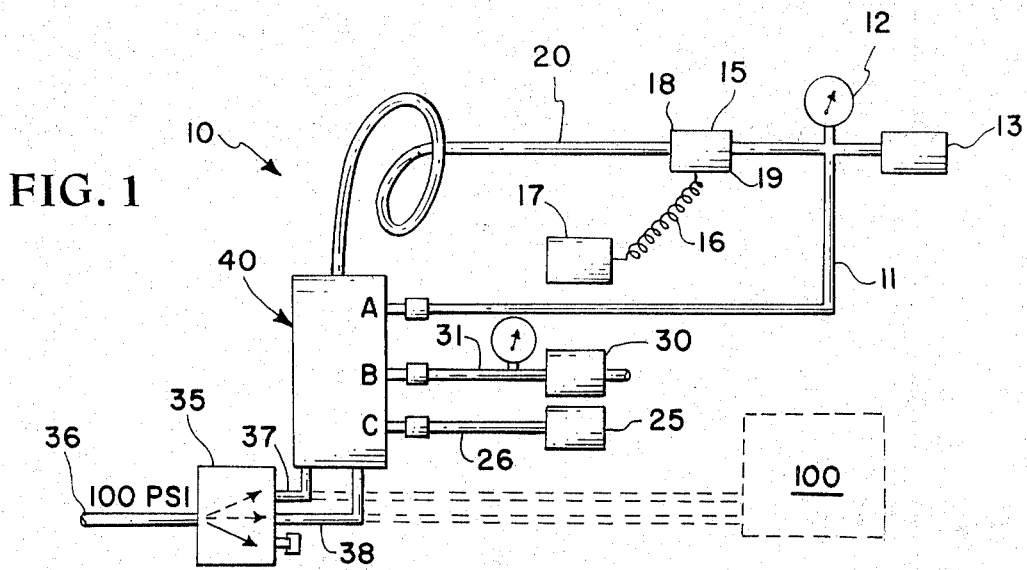
FIG. 1 is a schematic view of the entire pressure transducer calibration system.
Figure 3:
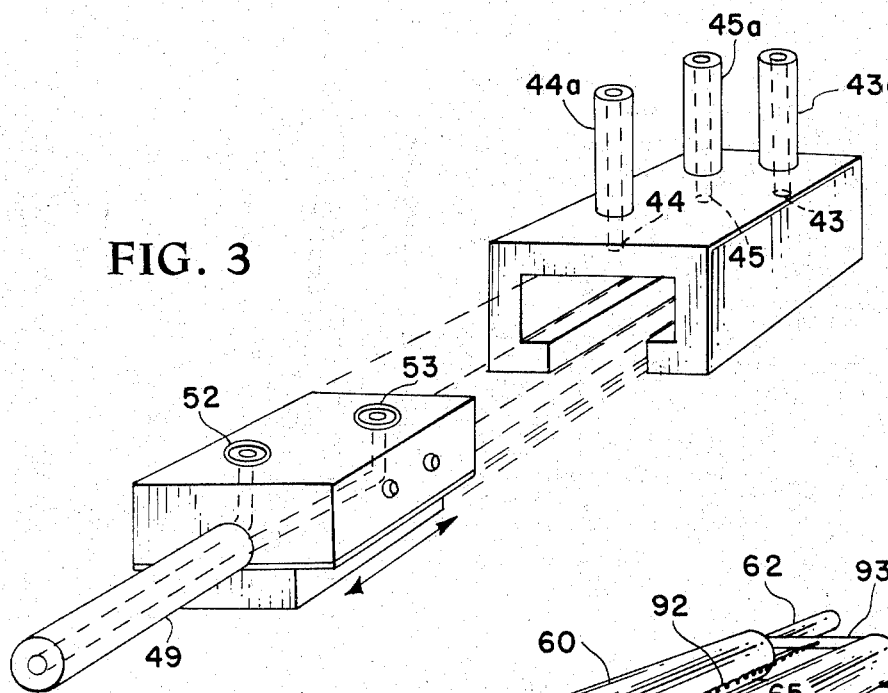
FIG. 3 is a perspective view of the selector valve body showing the valve slide removed.

The pressure transducer calibration system is best illustrated diagramatically in FIG. 1 and is identified by the reference numeral 10.

The purpose of the system 10 is to calibrate the pressure transducer 15 which has an active side 18 and a reference side 19. The active side 18 is subjected to the pressure which it is desired to measure and the reference side 19 is subjected to a reference pressure, the difference of which provides an output which is the function of the transducer. The output is fed through a line 16 to a readout device or indicator 17 which is of conventional design and may be of the pressure or electronic actuated type.

A source of reference pressure 13 is connected to a reference line 11 which is in turn connected to the reference side of the pressure 11 transducer 18. A reference pressure gauge 12 is also placed in the reference line so that the operator can at all times determine the reference pressure.

A flexible feedline 20 is connected between the pressure transducer 15 and the selector valve which is designated generally by the reference numeral 40. The details of the reference valve will be explained more fully hereinafter. The reference line 11 is connected to the selector valve 40 at point A and the pressure therefrom can be routed through the valve 40 to the line 20 which applies the reference pressure to the side of the pressure transducer. If the pressure transducer is operating properly the output will be zero since the same pressure is being applied to both sides of the transducer.

A known pressure 30 is applied through line 31 to the selector valve 40 at point B and routed thereby to the line 20 and the active side of the pressure transducer 15. Since this pressure is a standard known pressure, the output at meter 17 provides a known calibrated pressure which can be recorded.

An unknown pressure 25, which is the pressure normally read by the transducer in a test arrangement, is supplied by line 26 to point C of the selector valve 40 and to the line 20 and the active side of the pressure transducer 15. The reading of this pressure at the indicator 17 shows the test or operating mode of the pressure transducer 15.

Referring now to the details of the selector valve 40, they are best shown in FIGS. 2, 3, and 4a–c of the drawings. The selector valve has a body 41 in which is formed a T-shaped slot 42. Formed in the top of the body 41 are a zero or reference inlet 43, a known inlet 44, and unknown inlet 45. These inlets are merely holes formed through the top of the valve body and are strategically located so that the valve slide may register with the particular inlet depending upon its position. Associated with inlets 43, 44, and 45 may be short nipples 43a, 44a, and 45a, which are utilized in connecting the various inlets with the reference line 11, known pressure line 31 and unknown line 26.

The valve slide 48 (FIG. 3) has a T-shaped cross section which matches the shape of the T-shaped slot 42 in the selector valve body 40. An output line 49 is associated with L-shaped branch lines 50 and 51 which are formed in the body of the valve slide member. The output lines 50 and 51 terminate at the top surface of the valve slide and are positioned so that they will register with the outlets 43, 44 and 45, formed in the valve body of 41. 0-ring seals 52 and 53 surround the openings of the output branch lines 50 and 51 and engage the T-slot formed in the valve body to provide the necessary pressure seal between the valve body and the valve slide member.

Figure 4A:
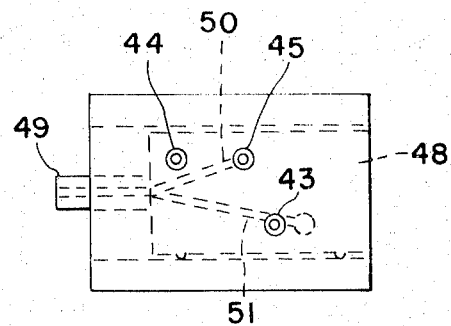
FIGS. 4a, 4b and 4c are top plan views of the selector plan body showing the various positions of the valve slide and how the parts register with the various valve outlets.
Figure 4B:
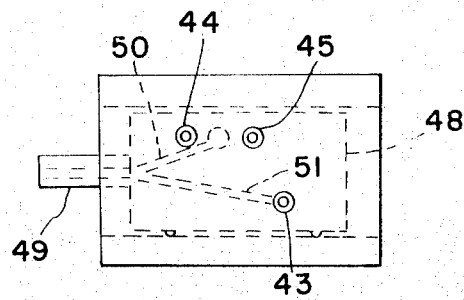
Figure 4C:
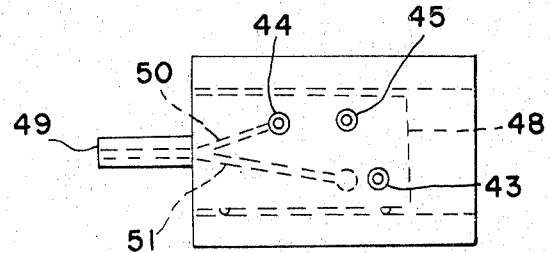

FIGS. 4a–4c illustrate how the output branch lines 51 and 52 register with the various outlets depending on the position of the valve slide member. In the position shown in 4a, the line 50 registers with the outlet 45. In FIG. 4b, the line 51 registers with the outlet 43, and in FIG. 4c the line 50 registers with the outlet 44.

The valve slide 48 is moved by a piston/cylinder arrangement which is best illustrated in FIGS. 2 and 5a-5c. This arrangement is secured to the bottom of the valve body 60 in a conventional manner such as by screws or welding. The arrangement has a first cylinder 60 having an open end with an inturned flange 61. Opposite the open end is an inlet 62 which is utilized to introduce fluid pressure into the cylinder. A similar cylinder 65 having an open end and inturned flange 66 is positioned parallel to the cylinder 60 and is attached to the bottom of the valve body 41 in a conventional manner. The cylinder 65 has inlet tube 67 which is utilized to admit fluid pressure to this cylinder.

A U-shaped piston yoke designated generally by the reference numeral 70 has a cross arm 71 and piston rods 72 and 74 the ends of which project into the open ends of the cylinders 60 and 65. A piston 73 is connected to the end of rod 72 and is operative in the cylinder 65. A floating piston 80 is located in the cylinder 60. The floating piston 80 has a guide recess 83 formed in the one end thereof which receives an extension 76 of the piston rod 74. Located intermediate the extension 76 and the rod 74 is an annular collar 75 which is larger in diameter than the guide recess 83. The collar acts as a reaction surface against which the floating piston 80 can operate.

Figure 5A:
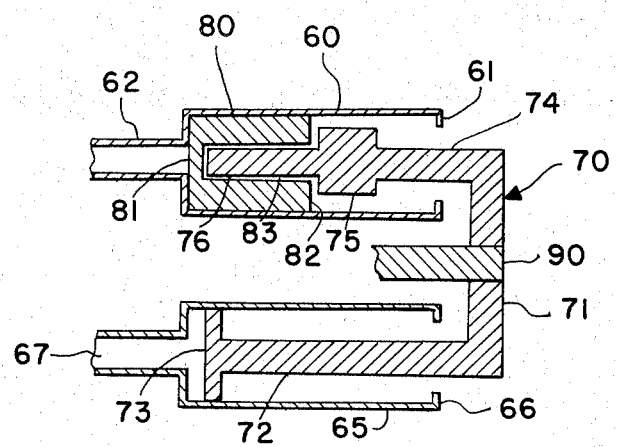
FIGS. 5a, 5b and 5c show a cross-sectional view of the dual piston and floating piston arrangement and the various positions assumed by the pistons which control the position of the valve slide.
Figure 5B:
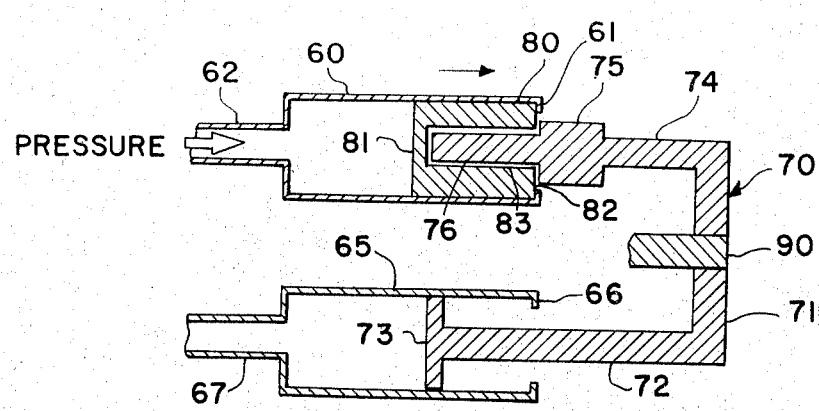
Figure 5C:
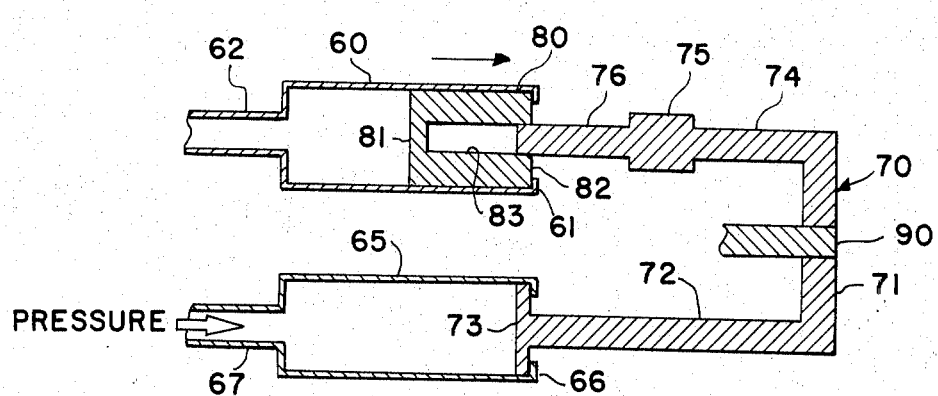

It is apparent from FIG. 5b when pressure is admitted to the cylinder 60, the floating piston 80 carries the entire piston yoke assembly 70 until the foot 82 of the piston 80 engages the flange 61. In FIG. 5c, it is shown that when pressure is admitted to the cylinder 65, the reaction on piston 73 will move the piston yoke 70 until the piston 73 engages the flange 66 of piston 65. It can also be seen in FIG. 5c that the extension 76 of piston rod 74 is still within the guide recess 83 in the floating piston 80 and is supported thereby. However, the yoke has also been able to move relative to the floating piston 80 to assume the new position.

Figure 2:
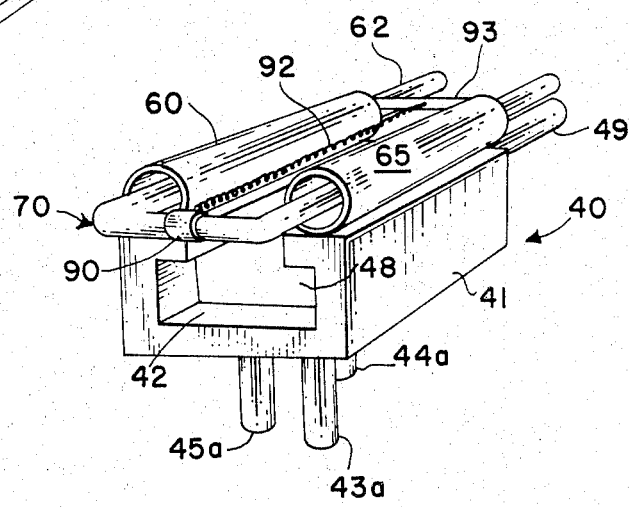
FIG. 2 is a perspective view of the selector valve without the valve slide and shows the arrangement whereby the pistons for actuating the selector valves are located with respect thereto and how they are yoked together.

As shown in FIG. 2, a strap 90 is fixed to the cross arm 71 of the piston yoke 70, and to the valve slide 48. Thus, when the piston yoke 70 is moved, the valve slide 48 is also moved since the two members are directly tied together. A spring 92 is connected to the strap 90, and therefore the piston yoke 70, and to an anchor plate 93 which is fixedly secured to the inlet ends of the cylinders 60 and 65. The spring 92 biases the piston yoke 70 and the valve slide 48 to the positions shown in FIGS. 4a and 5a. This is the normal retracted position of the selector valve arrangement and is the position whereby the unknown pressure is applied to the pressure transducer. Thus, if no pressure is available to operate the selector valve 40, the transducer 15 will still be operable to determine the unknown pressure.

Referring again to FIG. 1, an actuator or distribution valve 35 having a supply line 36 and output lines 37 and 38 is shown associated with the system 10. The output lines 37 and 38 are connected to the selector valve 40, the outlet line 37 being connected to the inlet 62 and the outlet 38 being connected to the inlet 67 of the selector valve 40. The actuator valve 35 can be of any conventional design and is utilized to direct actuation pressure to either the cylinder 60 or the cylinder 65 or prevent pressure from reaching either one of the cylinders. The actuating pressure is supplied to the supply line 36 by conventional methods such as a pump and holding tank arrangement.

The actuator valve 35 can also be utilized to simultaneously supply liquid to another pressure transducer calibration system illustrated diagramatically as a block and designated by the reference numeral 100 in FIG. 1. This system would be essentially identical to the system 10 and the input to its selector valve would merely be tied into the lines 37 and 38 of the existing system. Thus, when the actuator valve 35 admitted pressure to one of the lines in the system 10, it would also admit pressure to the same line in the system 100. Since the system 100 would otherwise be similar to the system 10, it is believed unnecessary to further describe the system. Obviously, additional systems could be tied into the actuator valve 35.

OPERATION

From the above description of the invention, the operation of the device is believed apparent; however, the operation sequence will be detailed to fully describe the invention.

In normal operation, the actuator valve 35 is in the lower or closed position (shown by dotted arrow in FIG. 1) preventing fluid pressure from being directed to either the cylinder 60 or 65. With no pressure applied to the cylinders 60 and 65, the spring 92 biases the valve slide 48 to the position shown in FIGS. 4a and 5a. In this position, the source of unknown pressure 25 is directed through the line 26 through inlet 45 into the branch line 50 and through output line 49 into the flexible feedline 20 which applies the pressure to the active side 18 of the pressure transducer 15. The output of the pressure transducer 15 is then fed through the line 16 to the readout device 17 which gives an indication of the unknown pressure. Thus, if the pressure transducer 15 is located at the leading edge of an airfoil which may be in the process of being tested in a wind tunnel, the readout at indicator 17 would be the pressure which the transducer 15 is reading as the wind in the wind tunnel flows by the pressure transducer.

If the actuator valve 35 is moved to the center position (as shown by the dotted arrow in FIG. 1), the actuating pressure is admitted to line 38 which is connected to the inlet 62 and admits pressure to the cylinder 60. The fluid pressure acts against the head 81 of the floating piston 80 which engages the collar 75 and moves the piston yoke 70 to the position illustrated in FIG. 5b. In this position, the known pressure 30 is conducted through line 31, inlet 43 (FIG. 4b) branch line 51 in the valve slide member 48, to outlet line 49 and into flexible line 20 which applies this pressure to the active side 18 of pressure transducer 15. In this position, the known pressure is routed to the pressure transducer to calibrate and record at indicator 17 a known pressure output.

Selecting the upper position of actuator valve 35 (shown by dotted arrow in FIG. 1), the actuation pressure is admitted to the line 37 which is connected to the inlet line 67 of cylinder 65. This actuation pressure acts against the piston 73 and further moves the piston yoke 70 to the position shown in FIG. 5c. Movement of the piston yoke 70 in turn moves the valve slide 48 so that it registers with the inlet 44. The reference pressure 13 (FIG. 1) is conveyed through line 11 to the inlet 44 through the branch line 50 to the outlet line 44 which is connected to the flexible line 20. This arrangement routes the reference pressure to the active side 18 of the pressure transducer 15 and provides a zero reading at the indicator 17. Since the reference pressure is now applied to both sides of the pressure transducer 15, the indicator output should be zero.

When the actuator valve 35 is returned to the lower position, the actuation pressure is relieved from the selector valve 40 and the spring 92 will return the valve slide member to its retracted position shown in FIGS. 4a and 5a and the unknown pressure is again applied to the pressure transducer.

From the above description of the calibration system structure and its operation, the many advantages of the device are believed to be apparent. The overall size of the selector switch is 0.2 inch by 0.4 inch by 0.6 inch and can therefore be placed immediately adjacent the pressure transducer. Thus, lagtime effects resulting from long connecting tubes to the transducer has been eliminated. This arrangement provides for in situ calibration of the transducer during the testing by providing for one position for transducer zero, a second position for a known calibrate pressure, and in a third position for measurement of the unknown test pressure. Large numbers of transducers can be simultaneously calibrated from a remote location in a matter of seconds. In a typical application, transducers and pressure valves can be installed inside models for wind tunnel testing. Subsequent calibrations can be made from a control station before, during and after test runs to correct for sensitivity and zero changes. If for any reason the actuating pressure to the selector valve should fail, the selector valve is always biased to the position such that a reading of the unknown pressure is obtainable. The system is designed such that the actuating pressure utilized for the selector valve is entirely separate from the pressures applied to the transducer. Thus, there is no danger of actuation pressures leaking into the transducer lines thereby giving an erroneous reading. The actuation mechanism is positive, simple, and durable. Also, the system can operate over a great range of pressures including negative pressures. The device is capable of operating under adverse temperature conditions. And, of great importance, the invention provides a device for calibration of transducers without interruption to the test as set up.

What is claimed as new and desired to be secured by Letters Patent of the United States is:

1. A pressure transducer calibration system comprising:

pressure transducer means having an active side and a reference side;
   selector valve means small enough to be placed immediately adjacent said pressure transducer means;
   means connecting said selector valve means with the active side of said pressure transducer means;
   a source of known pressure connected to said selector valve means;
   a source of test pressure connected to said selector valve means;
   a source of reference pressure connected to the reference side of said pressure transducer means and to the selector valve means;
   means for operating said selector valve to selectively admit said reference pressure, said known pressure and said test pressure to the active side of said pressure transducer to accurately calibrate said pressure transducer located in a test environment and means for reading the output of said transducer.

2. A pressure transducer calibration system as in claim 1 wherein said means for operating said selector valve means is a source of operating pressure controlled by pressure distribution means.

3. A pressure transducer calibration system as in claim 2 wherein said selector valve means has slider means;
   said slider means having ports which selectively register with said reference pressure, said known pressure, said test pressure and being joined with said means connecting the selector valve means with the active side of said transducer means;
   said slider means being attached to actuator means;
   said actuator means being operable under the influence of said operating pressure to move said slider means ports to register with said reference pressure, said known pressure and said test pressure.

4. A pressure transducer calibration system as in claim 3 wherein said actuator means includes first and second cylinder means;
piston means operable in said first and second cylinder means, one of said piston means movable a predetermined distance under said operating pressure to position said slider means;
and the other piston means movable a predetermined further distance under said operating pressure to further position said slider means.

5. A pressure transducer calibration system as in claim 4 wherein said first and second piston means are associated with yoke means, said yoke means carrying connecting means with said slider means;
bias means connected to said yoke means and selector switch means to move said slider means to another predetermined position in the absence of operating pressure.

6. A pressure transducer calibration system as in claim 4 wherein said pressure distribution means directs operating pressure to first one cylinder and then to another cylinder.

7. A pressure transducer calibration system as in claim 2 wherein operating pressure is directed to multiple selector valve means associated with multiple pressure transducer means by said distribution means.

8. A pressure transducer calibration system as in claim 3 wherein said means connecting said selector valve means with the active side of said pressure transducer means is flexible conduit means.

9. A pressure transducer calibration as in claim 5 wherein one of said piston means floats in one of said cylinder means;
said yoke means having first and second rod means the first of which is connected to one of said piston means and the second of which has mating engagement with said floating piston means and being movable relative thereto; and
collar means attached to said second rod means.

10. A pressure transducer calibration system as in claim 9 wherein said first and second cylinder means have flange means;
said floating piston means engaging said collar means and moving said yoke means and thereby said slider means until said floating piston means engages one of said cylinder flange means thereby locating said slider means at a predetermined position;
said other piston means moving said yoke means and thereby said slider means further until said other piston means engages the other cylinder flange means thereby locating said slider means at another predetermined position.

11. In a pressure calibration system for a differential pressure transducer wherein the reference side of said transducer is supplied with a reference pressure and wherein the active side of said transducer is selectively supplied with said reference pressure to verify the accuracy of said transducer at zero differential pressure; with a known pressure to verify the accuracy of said transducer at said known pressure; and with a test pressure which said transducer monitors for information purposes:
a selector valve means for selectively supplying said three pressures to said active side of said transducer comprising a slider means;
said slider means having ports which selectively register with said reference pressure, said known pressure, and said test pressure and said ports being joined with a connecting means said connecting means connecting said selector valve means with the active side of said transducer;
said slider being attached to actuator means;
said actuator means being operable under the influence of operating pressure to move said slider means ports to register with said reference pressure, said known pressure and said test pressure.

12. A selector valve means as in claim 11 wherein said actuator means includes first and second cylinder means;
piston means operable in said first and second cylinder means, one of said piston means movable a predetermined distance under said operating pressure to position said slider means;
and the other piston means movable a predetermined further distance under said operating pressure to further position said slider means.

13. A selector valve means as in claim 12 wherein said first and second piston means are associated with yoke means, said yoke means carrying connecting means with said slider means;
bias means connected to said yoke means and selector switch means to move said slider means to another predetermined position in the absence of operating pressure.

14. A selector valve means as in claim 11 wherein said operating pressure is directed to first one cylinder and then to another cylinder.

15. A selector valve means as in claim 13 wherein one of said piston means floats in one of said cylinder means;
said yoke means having first and second rod means the first of which is connected to one of said piston means and the second of which has mating engagement with said floating piston means and being movable relative thereto; and
collar means attached to said second rod means.

16. A selector valve means as in claim 15 wherein said first and second cylinder means have flange means;
said floating piston means engaging said collar means and moving said yoke means and thereby said slider means until said floating piston means engages one of said cylinder flange means thereby locating said slider means at a predetermined position;
said other piston means moving said yoke means and thereby said slider means further until said other piston means engages the other cylinder flange means thereby locating said slider means at another predetermined position.

* * * * *